Patented Apr. 9, 1935

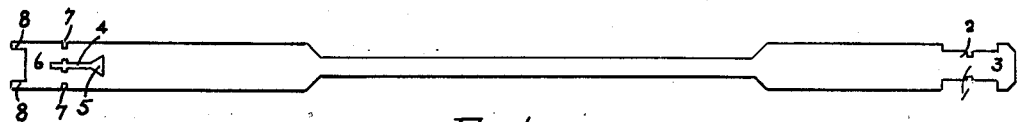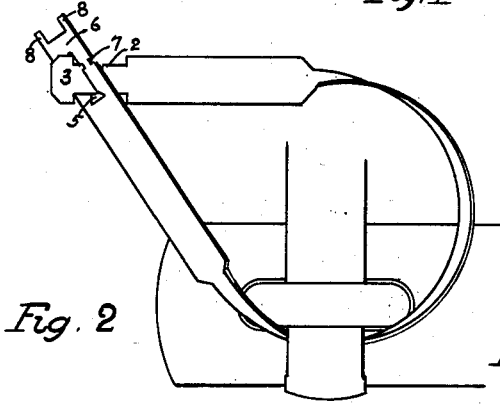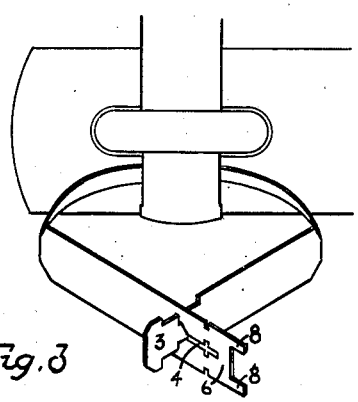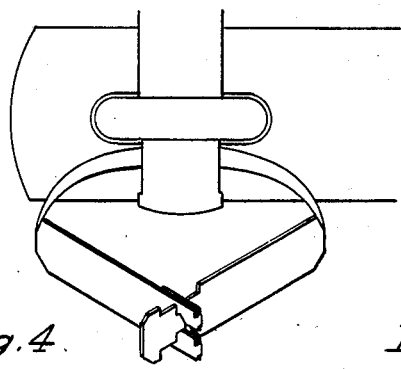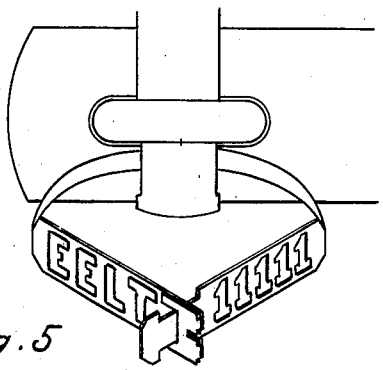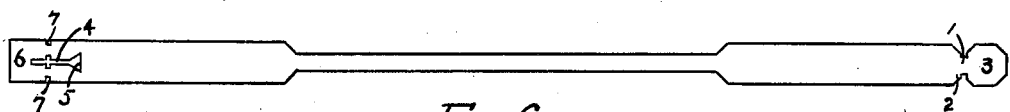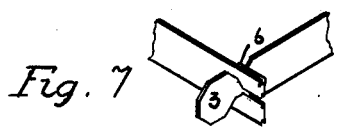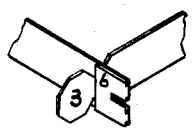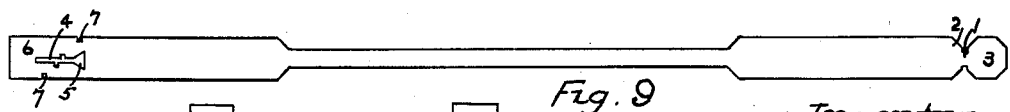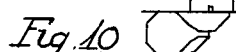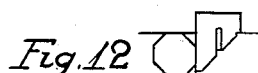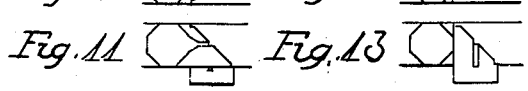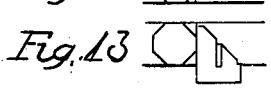

1,997,169

UNITED STATES PATENT OFFICE 1,997,169

SEAL

George B. Edgar, Lawrence, Kans., assignor to The Edgar Steel Seal & Manufacturing Co., Lawrence, Kans.

Application February 26, 1934, Serial No. 712,960

2 Claims. (Cl. 292—315)

My invention relates to seals generally but particularly to seals of the open-lock and frangible type used on box freight-cars, oil-tanks, tank-cars, corn-cribs, milk cans and other containers into which goods, wares and merchandise that might tempt thieves may be placed for shipment or storage, or into which condemned meats and other food products may be placed upon inspection to prevent their sale or use, and on fare receptacles on street cars and other public conveyances, etc., etc.

The object of my invention is the production of a seal that will be cheaper than those now in use, that may be readily applied with the hands bare or gloved and without any auxiliary tool, that cannot be removed and again replaced without detection, that may be easily and exhaustively inspected for tampering, etc., without close examination, upon which numbers and other indicia of identification may be impressed or embossed of such size as to be readily readable without close inspection, and that will inevitably be destroyed as a seal upon being opened or removed.

I attain these objects by a device illustrated in the accompanying single sheet of drawing in which Fig. 1 is a plan view, Fig. 2, a perspective in arrested process of application to a conventional hasp-staple-and-locking-pin type of fastening partially shown in elevation but being no part of this invention, Fig. 3, a perspective in later arrested process of application to such a fastening, Fig. 4, a similar perspective of the device completely applied to such a fastening and showing the locking or securing member bent back to the right, while Fig. 5 is the same with said member bent back to the left.

A variant is shown of which Fig. 6 is a plan view, and Figs. 7 and 8, partial perspectives showing the engagement with the locking or securing member bent down to the right and the left respectively. Another variant is shown of which Fig. 9 is a plan view, and Figs. 10, 11, 12 and 13 are elevations directly presenting the engagements, 10 and 11 showing the locking member bent up and down respectively to the right, and 12 and 13 showing the locking member bent respectively up and down to the left.

Said figures are approximately of the same size as the seal itself, or the parts thereof shown, and similar numerals refer to similar or corresponding parts throughout the several views.

The seal is die-struck or stamped from a relatively thin strip of material, preferably from what is known as ribbon steel, but may be made out of any other metal, alloy or other suitable material that is both elastic and frangible so that it may be twisted at least a quarter turn and bent into hoop form without rupturing, that will stay in place when bent abruptly or double along any given cross line, and that will infallibly break and part when an attempt is made to unbend or straighten same at such abrupt or double bend.

Referring to the drawing, the strip is narrowed along its middle reach so as to facilitate twisting, and shaped at one of its ends so as to have thereat a neck 1 flanked by shoulders 2 and surmounted by a head 3, their thickness being that of the strip, while the maximum length and breadth of the head is the same as the width of the strip, and the breadth of the neck at its narrowest point, approximately a third of said width. Adjacent the neck, both head and shoulders are narrowed to about two thirds the width of the strip so as to make way for the spurs of the locking member to be presently described. Near the other end of the strip, and on, or approximately on its median line, same is perforated and provided with a longitudinal slot 4, of but slightly greater length and breadth than the breadth and thickness respectively of said head, so as to just admit same when inserted therein upon the strip's being twisted a quarter, or approximately a quarter turn. At the inner end of said slot there is an enlargement or flare 5 thereof of the shape, or approximate shape of an equilateral triangle, whose base is perpendicular, or approximately perpendicular to the edges of the strip, and slightly longer than the breadth of said neck at narrowest point, so as also to just admit and engage same at right angles, or approximate right angles to the edges of the strip when said head 3 has been inserted and passed on through said slot 4, the neck 1 pressed into said flare, and the strip untwisted, as shown in Fig. 3.

In order to secure said engagement in this position, this slot end of the strip is made to terminate in a locking member, tab or tongue 6, defined and rendered abruptly bendable across the median reach of said slot 4, and on the line between them, by the notches 7 in the edges of said slot and strip, so that, when bent double or completely back in either direction on said line, the extremity of said tongue or tab will not only contact with and press against said neck and shoulders, or said neck and head as shown respectively in Figs. 4 and 5, thus firmly holding said neck against the base of the triangular enlargement 5, and holding the engagement in place at right angles to the edges of the strip, but the slot 4 will be so shortened that it will be impossible to withdraw the head 3 therefrom without completely straightening or unbending said tongue or tab at said bend. And in order to stay this tab or tongue in this position, same is provided at its extremity with projections or spurs 8 to take position on either side of said narrowed head or shoulders, as shown in Figs. 4 and 5, the more completely in 5.

It will be observed that, if, as or when said tab or tongue is unbent or straightened as aforesaid, it will necessarily break at such abrupt or double bend and be severed from the rest of the seal, thus destroying it as such, and more or less obtrusively disclosing that it has been tampered with, or even opened and the container theretofore sealed by it entered and possibly rifled, which disclosure is one of the prime objects of the invention.

The variant shown in Figs. 6, 7 and 8, is in all respects approximately the same as the parent device just described except that there are no projections or spurs at the extremity of the tab or tongue, and no narrowing of the head or shoulders to make way for them when said tab or tongue is bent back against either of them and the intervening neck.

The variant shown in Figs. 9, 10, 11, 12 and 13 is really a variant of the above described variant. The difference being that the tab or tongue, instead of being bendable at right angles, or approximate right angles to the edges of the strip, is made to bend at an angle of forty-five, or approximately forty-five degrees, to said edges, either up or down to the right, as shown in Figs. 10 and 11, or to the left, as shown in Figs. 12 and 13, so that the engagement is held in place as aforesaid not by the end of the tongue 6, but by one of its sides, while in each case the slot 4, as in the parent construction and preceding variant, is shortened pending the engagement so as to necessitate the complete unbending or straightening of said tab or tongue in order to release it.

I am aware that I am not the first to secure the engagement of the ends of a sealing strip of this general type by bending the extremity of the slot end double and back against some part of the head end, and that such a construction is shown in Patent No. 1,064,462, June 10, 1913, to my brother William K. Edgar, now deceased, but I believe I am the first to make the bend across the slot at or near its middle so as to shorten it and necessitate the complete straightening or unbending of same in order to make possible the withdrawal of the head from the slot. In the construction shown in said patent the bend is at the outer end of the slot, making it possible to withdraw the head without completely unbending or straightening same. Besides, in that construction, though the slot may be said to be longitudinal, it is provided at its outer end with a cross T, while there is no twisting or untwisting of the strip in order to insert or withdraw the head.

Having thus described my invention, I claim:

1. In a seal of the kind described, a suitable strip of material shaped at one end into a head, neck and shoulders, and provided near the other with a longitudinal slot to admit said head, said slot being flared at its inner end to admit and engage said neck, and terminating in a tongue to shorten said slot pending said engagement and secure same, the said tongue being provided at its extremity with means to stay it in securing position.

2. In a seal of the kind described, a strip of frangible material shaped at one end into a head, neck and shoulders, and provided near the other with a longitudinal slot flared at its inner end to admit said head when said strip is twisted approximately a quarter turn and to engage said neck when said strip is untwisted, and terminating in a tongue to shorten said slot pending said engagement and to secure same, said tongue being provided at its extremity with spurs to stay it in securing position.

GEORGE B. EDGAR.